(12) United States Patent
Naidu, D.

(10) Patent No.: US 12,502,679 B2
(45) Date of Patent: Dec. 23, 2025

(54) CYCLONE FILTER

(71) Applicant: RAVANDS CONTROLS LLP, Chittoor Dt. (IN)

(72) Inventor: Damodara Naidu, D., Chittoor Dt (IN)

(73) Assignee: RAVANDS CONTROLS LLP, Chittoor (IN)

( * ) Notice: Subject to any disclaimer, the term of this patent is extended or adjusted under 35 U.S.C. 154(b) by 535 days.

(21) Appl. No.: 17/790,177

(22) PCT Filed: Dec. 30, 2020

(86) PCT No.: PCT/IB2020/062530
§ 371 (c)(1),
(2) Date: Jun. 30, 2022

(87) PCT Pub. No.: WO2021/137163
PCT Pub. Date: Jul. 8, 2021

(65) Prior Publication Data
US 2023/0075723 A1 Mar. 9, 2023

(30) Foreign Application Priority Data
Dec. 31, 2019 (IN) .......................... IN201941054592

(51) Int. Cl.
*B04C 5/107* (2006.01)
*B01D 21/26* (2006.01)
(Continued)

(52) U.S. Cl.
CPC ............... *B04C 5/107* (2013.01); *B04C 5/04* (2013.01); *B04C 5/14* (2013.01); *B01D 21/267* (2013.01)

(58) Field of Classification Search
CPC .............. B01D 21/267; B01D 21/0042; B01D 21/0087; B01D 21/02; B01D 21/265;
(Continued)

(56) References Cited

U.S. PATENT DOCUMENTS 3,988,132 A * 10/1976 Oranje .................... B04C 5/103
55/459.4
9,539,533 B2 1/2017 Schultz
(Continued)

FOREIGN PATENT DOCUMENTS

CN 201454710 U 5/2010
CN 109277210 A 1/2019
(Continued)

OTHER PUBLICATIONS

International Search Report for corresponding application PCT/IB2020/062530 filed Dec. 20, 2020; Mail date Apr. 8, 2021.
(Continued)

*Primary Examiner* — Akash K Varma
(74) *Attorney, Agent, or Firm* — CANTOR COLBURN LLP (57) ABSTRACT

A cyclone filter for separating heavy particles from water or any other liquid including a head to introduce the liquid into the filter, causing the liquid to swirl enhanced by an internal shape of head and flow of liquid takes turn around vertex pipe, the liquid containing solid foreign matter, a vertical vertex pipe to lead clean water out of the filter, a vane to separate head from separation chamber, a hollow cylindrical separation chamber where particles of more mass will be pushed away from the central axis and towards the wall due to increased flowrate and swirling action, a collection tank to collect the dropped particles, where the vane includes curved surfaces with substantially elliptical pathways perpendicular the vertex pipe that enhance the velocity of flow and its swirling action.

9 Claims, 8 Drawing Sheets

(51) Int. Cl.
*B04C 5/04* (2006.01)
*B04C 5/14* (2006.01)
*B04C 5/185* (2006.01)

(58) Field of Classification Search
CPC .......... B01D 21/26; B01D 21/00; B04C 5/04;
B04C 5/14; B04C 5/107; B04C 5/103;
B04C 5/185; B04C 3/06; B04C 2003/006
USPC ...................................... 210/512.1
See application file for complete search history.

(56) References Cited

U.S. PATENT DOCUMENTS

2013/0118960 A1* 5/2013 Tandon ................ B01D 21/267
210/512.2
2015/0068169 A1* 3/2015 Schulz .................. B01D 45/16
55/447

FOREIGN PATENT DOCUMENTS

CN 110252530 A 9/2019
EP 1534437 B1 * 9/2007 ............. B01D 45/16

OTHER PUBLICATIONS

Written Opinion of the International Searching Authority for corresponding application PCT/IB2020/062530 filed Dec. 20, 2020; Mail date Apr. 8, 2021.

* cited by examiner

Cut Section of Vane

Fig. 05(A)

Cut Section of Vane

Section: XX

CYCLONE FILTER

FIELD OF INVENTION

The present invention relates to a filter device. In particular, it relates to a cyclone filter device for separating heavy solid particles from a liquid.

BACKGROUND OF THE INVENTION

Separating heavy particles from the water or any other liquid is required in different applications. For instance filtration of sand and heavy mud particles from water in irrigation. Similarly, in industrial applications, raw water supplied to the plant also will have foreign particles which needs to be separated prior to use. In industrial applications, floor cleaning process will have contaminants, which also require separation. In most of the above agricultural and industrial applications, cyclone separators are used.

Reference has been made to patent document US 2013/0118960 A1. The second major element in the inventive apparatus of this document is a cylindrical cyclone housing 260 having male threads 270 on its exterior lower end 270, floor or deck 280 having a plurality of sediment holes 290, an integrally formed fluid conduit 300 extending downwardly from the underside 310 of the deck and upwardly from the top side 320 of the deck, a sealing ring 330 integral with the underside of the deck and sized with an exterior circumferential diameter to fit tightly against the interior side of the upper portion of the sediment bowl, and a flange 340 extending outwardly from its upper edge. The sealing ring includes an exterior annular groove 350 in which an O-ring seal 360 is disposed.

Reference has also been made to DE102013015052B4 which, in turn, discloses a Cyclone filter device for cleaning of a gas stream (with a hollow cylindrical pre-separator 4) On the outside thereof distributed over the circumference vanes (5) are arranged, wherein at least a part of the guide vanes (5) (With an at least approximately extending in the tangential rib 9) Is provided, which projects over the vane surface, characterized in that the rib (9) is rectilinear and tangential to or bent and formed concentrically with the pre-separator.

DE2500987 discloses an apparatus for the separation of liquids and/or solids from a gas stream consisting essentially of a cylindrical vessel, a feedline whose axis intersects the vessel axis, a drainage conduit axial to the vessel around which there is with some play a bushing with screws in which gas supplied is set in rotation and under which means are further provided for collecting and discharging the separated liquid and/or the separated solid particles, characterized in that under and over the screws (4) and approximately perpendicular to them guide vanes (14), one end of which contacts the bushing (9) and spirally moves away from the bushing (9), passing beyond a respective end (17) of the respective screw (4) and having a free end (16) of the guide vanes (14). between 0.33 and 0.90 times the distance between the sleeve (9) and the inner wall of the vessel it is (1) located.

In CN201454710, guide vane cyclone includes an outer tube 21 and a hollow exhaust pipe 22 disposed in the outer tube 21, wherein the outer tube 21 has a cylindrical structure, and a dust exhausting bottom plate 211 is disposed at the bottom of the outer tube 21, The end portion 222 of the hollow exhaust pipe 22 in the outer tube 21 is a rounded-shaped structure. On the outer circumference of the hollow exhaust pipe 22, a guide vane 221 is disposed. The edge of the guide vane 221 is in close contact with the inner tube wall of the outer tube, and the guide vane 221 The entrance angle, that is, the angle of the guide vane at the air inlet is 90°.

However, all the above mentioned prior arts have drawbacks as follows:
1. The prior art cyclone filters consists of baffle plate which separates the entering chamber with separation chamber resulting in unwanted accumulation of dust particles, which gets mixed in the flow and efficiency of the filtration is less during the next operation.
2. In the above designs, guide vanes are conventional flat type. Because of this designs, pressure drop occurs and sediments also settles during shutdown.
3. Earlier designs, vane is manufactured by machining and welding and cost of manufacturing are high.
4. Life of the prior art designs are less as all welded joints in vane and other parts are more prone for corrosion and failure.
5. Pressure drop is more in above designs and it causes the more power consumption.
6. Due to more pressure drop, flow rate (discharge) is also less.

SUMMARY OF THE INVENTION

The following presents a simplified summary of the invention in order to provide a basic understanding of some aspects of the invention. This summary is not an extensive overview of the present invention. It is not intended to identify the key/critical elements of the invention or to delineate the scope of the invention. The main object of present invention to overcome the drawbacks of the prior art technologies.

The first aspect of proposed invention is to provide Cyclone Filter for separating heavy solid particles from a liquid, comprising an inlet to introduce the liquid containing heavy particles into a head (1) having an internal shape such that it aids the liquid to follow a circular path within the head (1) and; a vertex pipe (3) having an outlet to lead clean water out of the filter; such that the internal shape of the head enhances the swirl of the liquid around the vertex pipe (3); a vane (2) to separate the head (1) from a hollow cylindrical separation chamber (4); such that particles of more mass are pushed away from the central axis and towards the wall due to increased flowrate and swirling action; a collection tank (6) to collect the separated particles; characterized in that the vane (2) comprises curved surfaces with substantially elliptical pathways (2A) perpendicular the vertex pipe (3) that further enhances the velocity of flow and its swirling action.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF ACCOMPANYING DRAWINGS

The above and other aspects, features and advantages of the embodiments of the present disclosure will be more apparent in the following description taken in conjunction with the accompanying drawings, in which:

FIGS. 2 (a) and (b) illustrates Assembly of Cyclone filter as disclosed one of the embodiments of present invention.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure. Throughout the drawings, it should be noted that like reference numbers are used to depict the same or similar elements, features, and structures.

DETAILED DESCRIPTION OF PRESENT INVENTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terminology used herein is for the purpose of describing particular various embodiments only and is not intended to be limiting of various embodiments. As used herein, the singular forms "a," "an" and "the" are intended to include the plural forms as well, unless the context clearly indicates otherwise. It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof. Also, Expressions such as "at least one of," when preceding a list of elements, modify the entire list of elements and do not modify the individual elements of the list.

The terminology used "substantially elliptical" can encompass an elliptical structure or a circular structure as a skilled person will readily understand that circle is a special form of ellipse wherein the major and minor axis of an ellipse is identical.

The present disclosure will now be described more fully with reference to the accompanying drawings, in which various embodiments of the present disclosure are shown. The present disclosure may, however, be embodied in many different forms and should not be construed as being limited to the various embodiments set forth herein, rather, these various embodiments are provided so that this disclosure will be thorough and complete, and will fully convey the present disclosure. Furthermore, a detailed description of other parts will not be provided not to make the present disclosure unclear. Like reference numerals in the drawings refer to like elements throughout.

Figure 1:
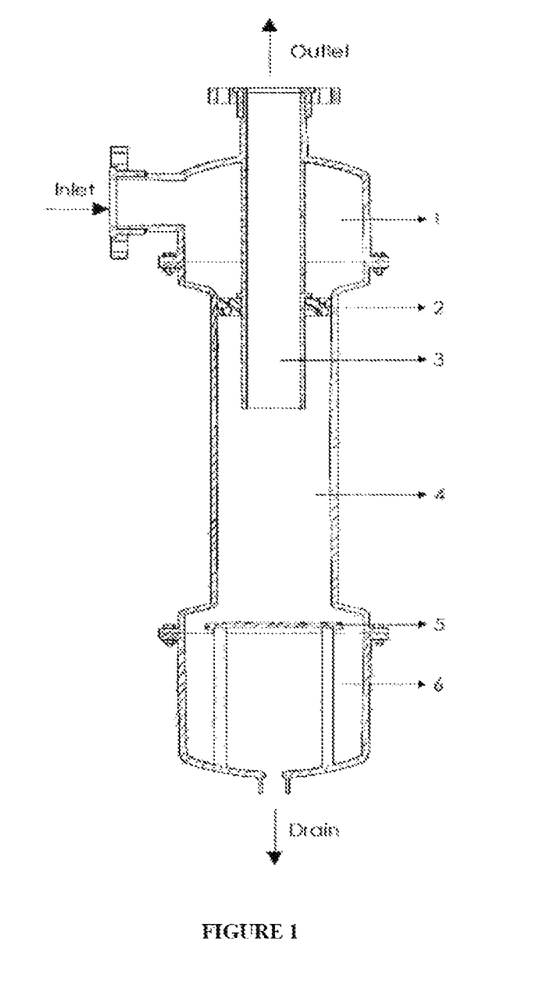
FIG. 1 illustrates General arrangement of Cyclone filter assembly as disclosed one of the embodiments of present invention.
Figure 02A:
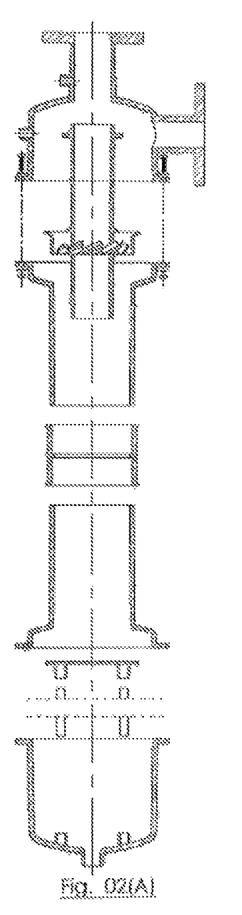
Figure 02B:
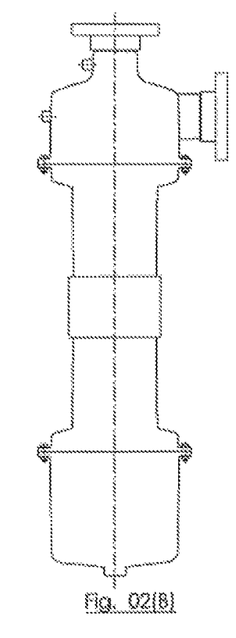
Figure 3:
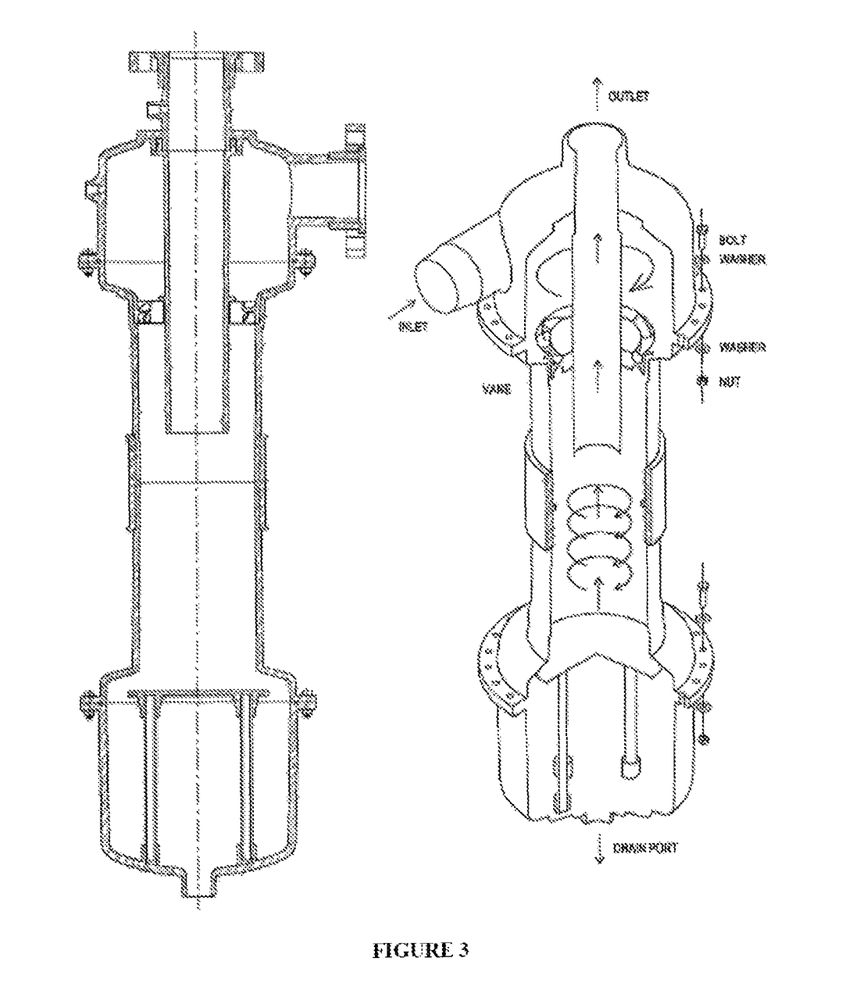
FIG. 3 discloses Cut section of Cyclone filter as disclosed one of the embodiments of present invention.
Figure 4:
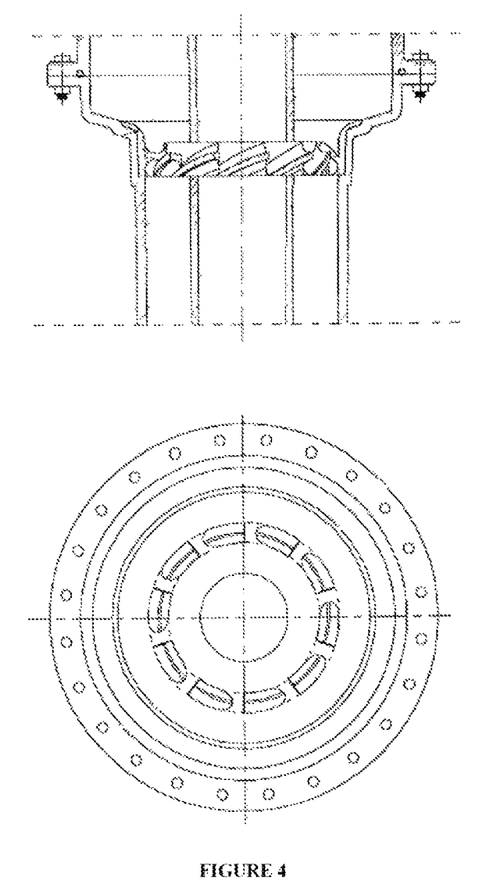
FIG. 4 illustrates the Vane of Cyclone filter as disclosed one of the embodiments of present invention.
Figure 05A:
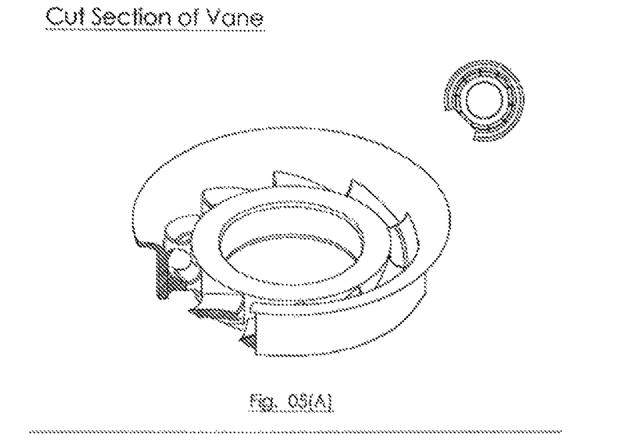
FIGS. 5(a) and 5(b) illustrates the cut section of Vane of Cyclone filter as disclosed one of the embodiments of present invention.
Figure 05B:
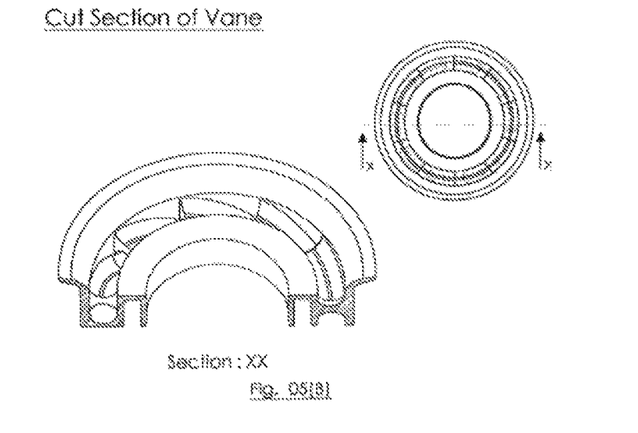

The subject invention, referring to FIG. 1, lies in providing a Cyclone Filter for separating heavy particles from water or any other liquid comprising a Vane (2) to separate Head (1) from separation chamber (4).

One of the embodiment relates to, referring to FIG. 1-5, a Cyclone Filter for separating heavy solid particles from a liquid, comprising an inlet to introduce the liquid containing heavy particles into a head (1) having an internal shape such that it aids the liquid to follow a circular path within the head (1) and; a vertex pipe (3) having an outlet to lead clean water out of the filter; such that the internal shape of the head enhances the swirl of the liquid around the vertex pipe (3); a vane (2) to separate the head (1) from a hollow cylindrical separation chamber (4); such that particles of more mass are pushed away from the central axis and towards the wall due to increased flowrate and swirling action; a collection tank (6) to collect the separated particles; characterized in that the vane (2) comprises curved surfaces with substantially elliptical pathways (2A) perpendicular the vertex pipe (3) that further enhances the velocity of flow and its swirling action.

The internal shape of the head is often circular.

One of the preferred embodiment of the present invention discloses the pathways to be circular or elliptical.

Another embodiment of the present invention discloses the shape of the surface of the path is flat or curved.

Another embodiment of present invention also discloses a Disc (5) on which the particle falls and spread out to be collected on the collection tank (6).

Yet another embodiment discloses that water/liquid from the pump/other source is entered in to the Head (1) of the filter tangentially with pressure and take substantially circular pathways of the internal structure.

Another embodiment discloses that the substantially elliptical pathways in the vane makes the stream injected in to the separation chamber (4).

Further embodiment discloses particles which are moved out by centrifugal action are dropped down along the wall of the separation chamber. Clean water will enter the vertex pipe (3) and comes out.

Vane design and placement is unique. The vane comprises curved surface thus velocity of the flow is increased drastically with less pressure loss.

Figure 7:
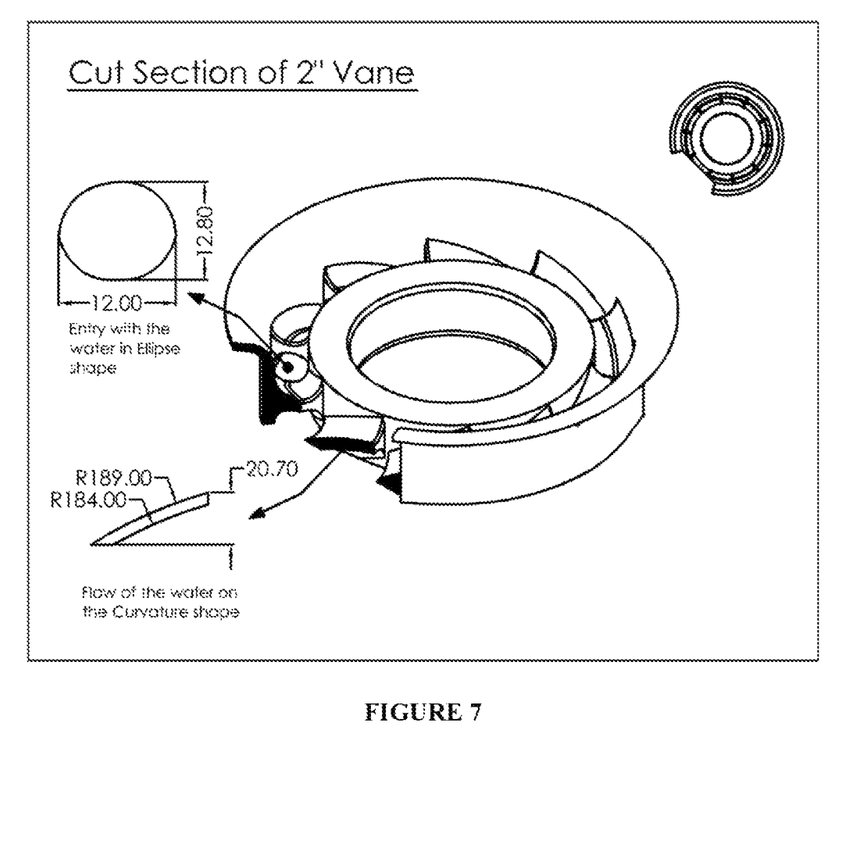
FIG. 7 illustrates cut section of Vane (2") as disclosed one of the embodiments of present invention.
Figure 8:
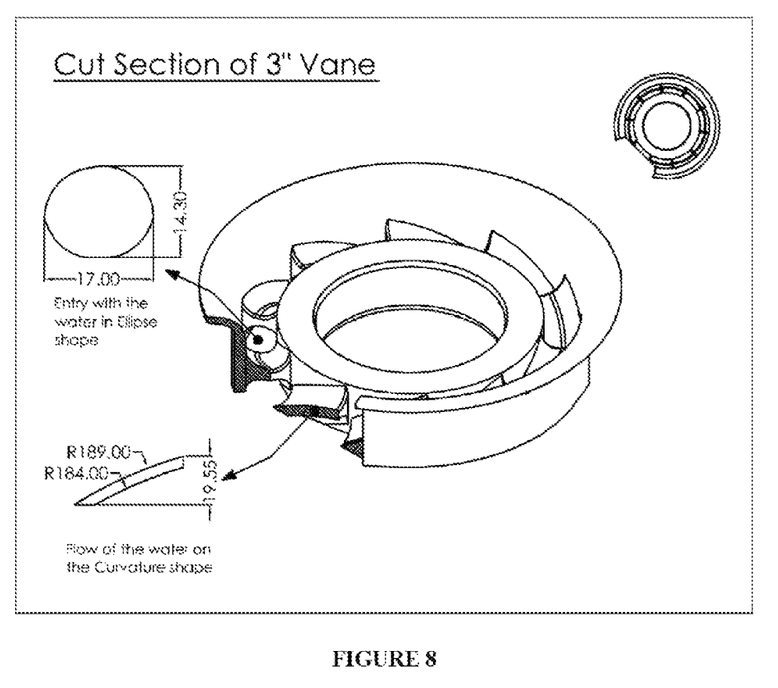
FIG. 8 illustrates cut section of Vane (3") as disclosed one of the embodiments of present invention.

Referring FIGS. 7 and 8, the vane surface is curved which is different from the conventional flat vane. In the flat vane design, space between the two vanes is rectangular where in present design the entry is substantially elliptical and size also optimally designed. Each size of the product to enhance the better flow with less pressure drop.

Once liquid enters the orifice which is substantially elliptical, the surface on the which the liquid flows is contoured for less friction and enhances the velocity of the liquid. The contour is design shown on the FIGS. 7 & 8 each size. In case of flat vane, friction is high and velocity of liquid is reduced.

Figure 6:
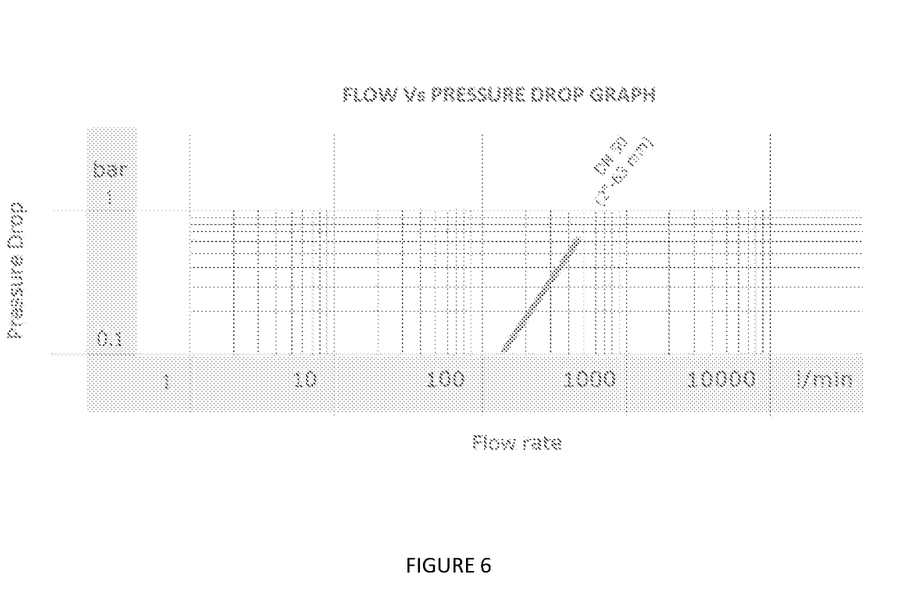
FIG. 6 illustrates the pressure vs flow rate curve as disclosed one of the embodiments of present invention.

This kind of contoured design has major advantages over conventional flat shaped vane designs. due less pressure drop there less power consumption for user. Also flow rate of the liquid is reduced less. Pressure drop curve (FIG. 6) shows the pressure across different flow rates.

The swirling action is enhanced by internal shape of head and flow of liquid takes turn around vertex pipe (4). In the course of swirling sand particles are moved out of central axis towards the wall of the Head due centrifugal action. Heavy particles will be moved out first and less mass particles will be next inner circle of the circular flow.

The present cyclone filter is based on the concept of having uniform pressure across the filter and the separator. Each part is designed by advanced engineering analysis tools for uniform stress distribution in the part and it can sustain impact and creep loads.

Pressure variation in total system is very less (less than 0.1 bar) so that the system is under less vibration during working. Differential pressure between parts creates vibration and life of the product will be less.

Vane is designed with uniform wall thickness with unique flow paths and stress distribution is uniform on the part. This kind flow paths can be done by injection molding plastics economically. Therefore, specially developed plastic alloy for manufacturing of vane is opted for. It is blend of Poly Phenylene Ether (PPE), Polystyrene (PS) and Glass fillers. By blending the above three materials, high tensile strength and impact strength is achieved along with abrasion resistance.

The same stream is entered to the vane (2). Vane has curved surface with substantially elliptical paths (2A) perpendicular the Vertex pipe. While water passing though the vane, velocity of flow is further increased and swirling action is still increased. The substantially elliptical paths in the vane makes the stream injected in to the separation chamber (4). Particles of more mass will be pushed away from the central axis and towards the wall of the Separation chamber. The shape and size of flow paths in the vane decides the efficiency of filtration and pressure drop. The flow paths in the vane are perpendicular to central axis make the efficiency of filtration more. It is shown in the FIG. 3.

Dropped particles will fall on the Disc (5) and spread out and the same will be collected on the collection tank (6). Collection tank will have drain valve and once it is opened sand particles along with water will be drained out.

Above product is made of plastic material with UV protection for direct sun light. Different parts are bolted together for easy maintenance. Plastic material is non-corrosive which can handle different quality of water and can work in different environments.

Filter parts are made up of Polypropylene Glass filled (PPGF) material for high tensile and impact strength. UV resistant materials are blended with above PPGF materials for resistance to direct sun light of products.

The performance of the present invention is decided by two parameters. One is pressure drop and other is efficiency of filtration at nominal flow rate. The solution provided in present invention ensures that pressure drop is reduced for given flow rate as well as efficiency of filtration also improved.

Some of the non-limiting advantages of present invention are:
1. Designed in such a way that no sand/mud particles are stagnated in the Head during shut down. Hence restart of the process will be smooth.
2. Due to present designs of vane path ways (substantially elliptical), the velocity of the fluid is increased with less drop. Sediments settling on the surface is less as the surface is contoured in circular shape.
3. Because of the unique design of the vane and positioning of the vane, velocity of the flow is increased drastically and tiny particles are also separated. As pressure drop of our designs are very less, power saving in running the pump is achieved.
4. Head (1) is bolted with the cyclone separator (4). Also the collection tank (6) is bolted to cyclone separator making the it easy for maintenance.
5. All parts are made up of specially developed plastic alloy. No corrosion like metal parts in the earlier designs.
6. Vane shape is designed uniquely which can injection molded economically.
7. Manufacturing cost is less.
8. Power consumption is less.
9. Flow rate (discharge) is more.
10. no welded joints in the vane and other parts and no corrosion.

The invention claimed is:

1. A cyclone filter for separating heavy solid particles from a liquid, comprising:
   an inlet to introduce the liquid containing the heavy solid particles into the cyclone filter;
   a head (1) having an internal shape such that the head aids the liquid to follow a circular path within the head (1);
   a vertex pipe (3) having an outlet to lead clean water out of the cyclone filter; such that the internal shape of the head enhances swirl of the liquid around the vertex pipe (3);
   a vane (2) to separate the head (1) from a hollow cylindrical separation chamber (4); such that the heavy solid particles of more mass are pushed away from a central axis and towards a wall due to increased flowrate and swirling action; and
   a collection tank (6) to collect the separated heavy solid particles;
   wherein the vane (2) comprises curved surfaces with substantially elliptical pathways perpendicular the vertex pipe (3) that further enhances velocity of flow and the swirling action, and the vane has an elliptical cross section to provide less pressure variation in total system so that the total system is under less vibration during working.

2. The cyclone filter as claimed in claim 1, wherein the substantially elliptical pathways are replacing circular or rectangular pathways.

3. The cyclone filter as claimed in claim 1, wherein the substantially elliptical pathways are elliptical.

4. The cyclone filter as claimed in claim 1, comprising a disc (5) on which dropped particle falls and spread out to be collected on the collection tank (6).

5. The cyclone filter as claimed in claim 1, wherein water/liquid from a pump/other source enters into the head (1) of the cyclone filter tangentially with pressure and take the circular path of the internal shape.

6. The cyclone filter as claimed in claim 1, wherein the heavy solid particles which are moved out by centrifugal action are dropped down along the wall of the hollow cylindrical separation chamber and the clean water will enter the vertex pipe (3) and come out of the cyclone filter.

7. The cyclone filter as claimed in claim 1, wherein the cyclone filter is made of plastic material with ultraviolet (UV) protection for direct sun light.

8. The cyclone filter as claimed in claim 6, wherein filter parts are made up of polypropylene glass filled (PPGF) material for high tensile and impact strength.

9. The cyclone filter as claimed in claim 1, wherein the vane is made by blending Poly Phenylene Ether (PPE), Polystyrene (PS) and Glass fillers to achieve high tensile strength and impact strength along with abrasion resistance.

* * * * *